United States Patent [19]

Bellon

[11] Patent Number: 5,132,989
[45] Date of Patent: Jul. 21, 1992

[54] METHOD OF TRANSMITTING A SEQUENCE OF M BINARY WORDS OF "P" BITS AND TRANSMISSION ARRANGEMENT IMPLEMENTING THIS METHOD

[75] Inventor: Gilles Bellon, Paris, France

[73] Assignee: U.S. Philips Corporation, New York, N.Y.

[21] Appl. No.: 604,731

[22] Filed: Oct. 22, 1990

[30] Foreign Application Priority Data

Oct. 27, 1989 [FR] France .................. 89 14140

[51] Int. Cl.⁵ ............................. H03K 5/156
[52] U.S. Cl. ..................... 375/25; 370/43; 370/83; 370/99; 341/95; 375/121
[58] Field of Search ......... 370/79, 82, 83, 43, 370/99; 375/25, 122, 37, 121; 358/11; 341/63, 67, 95

[56] References Cited

U.S. PATENT DOCUMENTS

| | | | |
|---|---|---|---|
| 3,310,626 | 3/1967 | Cassidy, Jr. | 370/43 |
| 3,716,851 | 2/1973 | Neumann | 375/110 |
| 4,126,764 | 11/1978 | Downey et al. | 370/83 |
| 4,420,833 | 12/1983 | Noirel | 370/83 |
| 4,734,768 | 3/1988 | Pexa | 370/83 |
| 4,833,470 | 5/1989 | Iketani | 341/95 |
| 4,885,749 | 12/1989 | Golden | 375/106 |
| 4,899,149 | 2/1990 | Kahan | 341/67 |

Primary Examiner—Benedict V. Safourek
Attorney, Agent, or Firm—David R. Treacy

[57] ABSTRACT

Binary words of the same length are grouped in codewords having a capacity for data bits which is not an integral multiple of the number of bits in a data word. Each of the codewords has the same length, and includes a plurality of data words in their entirety and all but a given number of bits of one other data word. A header codeword is provided which contains information identifying the number of following codewords related to that header, and a fixed length data field. The fixed length data field includes the missing bits from each of the incomplete data words in the following codewords. In one embodiment, the number of missing data bits contained in the header is used as an indication of the number of the following codewords. The location of the first of the missing data bits may be indicated by filling out the unused leading portion of the fixed length field with a string of zeros ending in a single one.

11 Claims, 4 Drawing Sheets

5,132,989

METHOD OF TRANSMITTING A SEQUENCE OF M BINARY WORDS OF "P" BITS AND TRANSMISSION ARRANGEMENT IMPLEMENTING THIS METHOD

BACKGROUND OF THE INVENTION

1. Field of the Invention

The present invention relates to a method of transmitting a sequence of M binary words of "p" bits by means of codewords of which the capacity is $(k \cdot p - \Delta)$ bits where k and $\Delta$ are integers and $\Delta < p$.

2. Description of the Related Art

Methods of this type are widely known and are thus found in important applications. Among them, the invention more particularly relates to radio links.

In this domain, various official national organizations impose standards for organizing the radio transmissions which take into account the uncertain and fluctuating nature of this type of transmission.

However, according to some of these standards, well adapted to radio networks, the bits are designed to be transmitted in codewords containing a number of bits which is not a multiple of the number of bits forming the numbers to be transmitted. Notably, reference is made in this context to British standard MPT 1317 issued by the DTI (Department of Trade and Industry) which proposes to transmit data in codewords of 47 useful bits; the formats of binary words are quite often 8 or 16 bits. Thus, these codewords cannot transmit these words integrally if one wishes to fully utilize them.

In radio links it is desirable, in order to be certain of a transmission, to send the codewords in packets and to ensure by means of a verification method that each packet is received well in advance of the next packet that is sent. One thus takes into account that it is utterly undesirable to have a binary word which is contained in two different packets.

SUMMARY OF THE INVENTION

It is an object of the present invention to provide a method of the type mentioned in the preamble and which avoids this inconvenience.

For this reason, such a method is characterized in that at least one codeword, termed header, comprises information denoting the value M and the value of M·$\Delta$ bits.

The invention also relates to a transmission arrangement for implementing the method.

BRIEF DESCRIPTION OF THE DRAWINGS

The following description, accompanied by the appended drawing, all given by way of non-limiting examples, will make it easier to understand how the invention may be realized, in which.

DETAILED DESCRIPTION OF THE PREFERRED EMBODIMENTS

Figure 1:
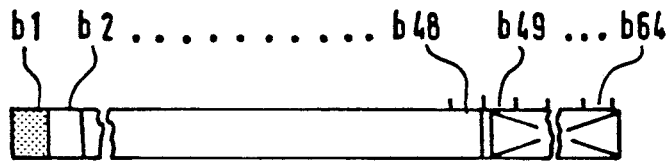
FIG. 1 shows the constitution of the codewords used for transmitting a word sequence.

FIG. 1 shows the structure of a codeword corresponding to the standard MPT 1317 which describes a basic signalling format. This codeword is formed by 64 positions for containing bits referenced $b_1, \ldots, b_{64}$. When the bit $b_1$ is "1" it denotes that the codeword is an address codeword and when it is "0" that the codeword is a data codeword. The 47 bits $b_2$ to $b_{48}$ define the useful information to be transmitted.

The bits $b_{49}$ to $b_{64}$ are check bits used with a processing in order to ensure a certain transmission security. This processing is not included in the scope of the invention and will thus not form a matter of discussion.

Figure 2:
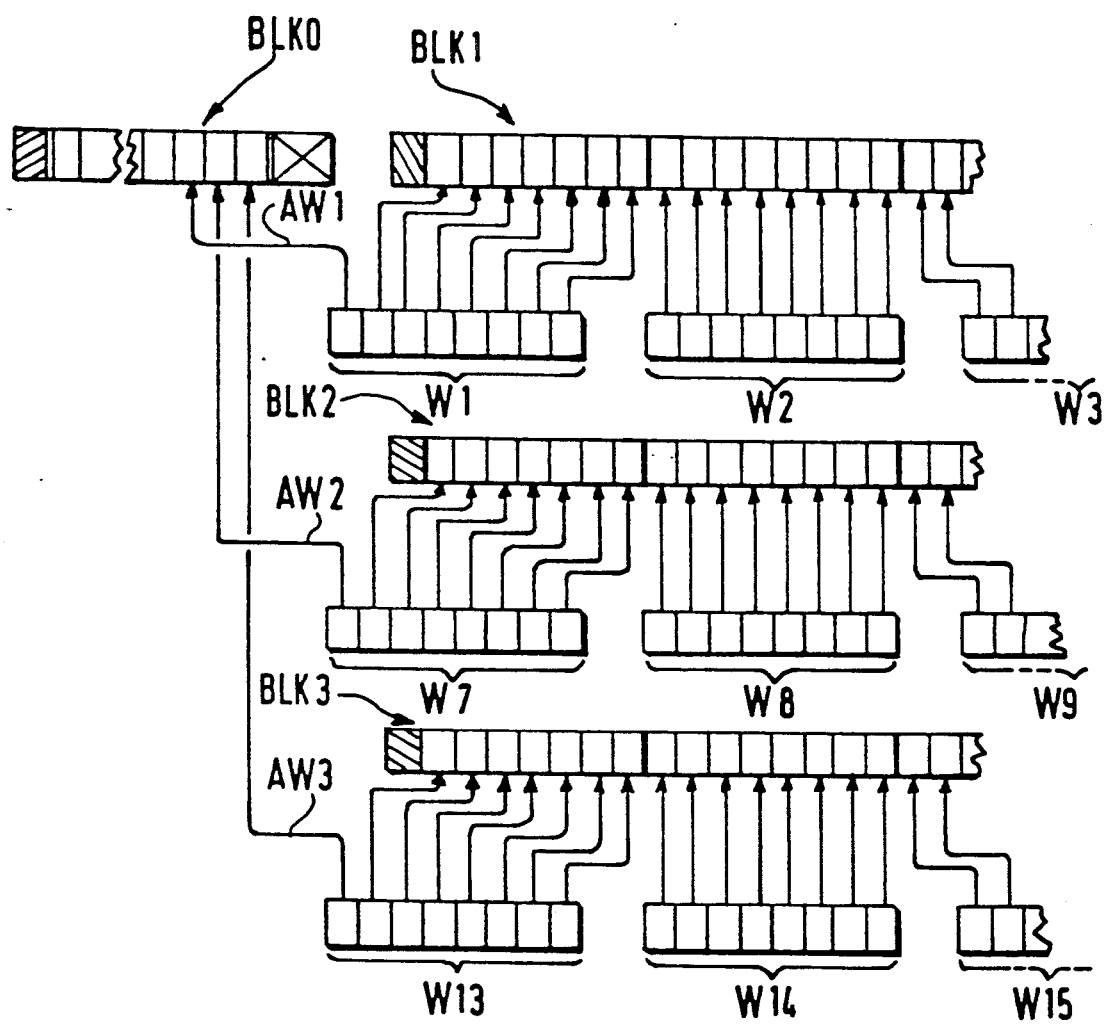
FIG. 2 shows a subdivision of the bits of the binary codewords to be transmitted.

FIG. 2 shows the method according to the invention. In this Figure the various codewords are referenced BLK0, BLK1, BLK2, BLK3 . . . . The M binary words W1, W2, W3, . . . , W18 are formed, within the framework of this described example, by eight bits so that the capacity of each codeword is 6 binary words minus one bit; worded differently: $k = 6$, $p = 8$ and $\Delta = 1$.

Still by way of example, it is thus proposed to send a sequence formed by 18 binary words W1, . . . , W18. According to the invention this sequence will be transmitted in four codewords BLK0, BLK1, BLK2, BLK3. The first codeword or the header contains an indication (which will be explained in the following) of the number of codewords used for transmitting the sequence and three bits which do not fit in the codewords BLK1, BLK2 and BLK3. Thus, the first bit of binary word W1 will be contained in a location of codeword BLK0 as denoted by the arrow AW1, the rest of the binary word W1 and the binary words W2 to W6 will be contained in codeword BLK1. In a similar manner the first bit of the binary word W7 will be inserted into codeword BLK0 as denoted by the arrow AW2, the rest of this binary word and the binary words W8 to W12 will be contained in codeword BLK2. Finally, The first bit of binary word W13 is contained in codeword BLK0 as denoted by the arrow AW3 and the rest of this binary word as well as the last binary words W13 to W18 of the sequence will be contained in codeword BLK3.

Figure 3:
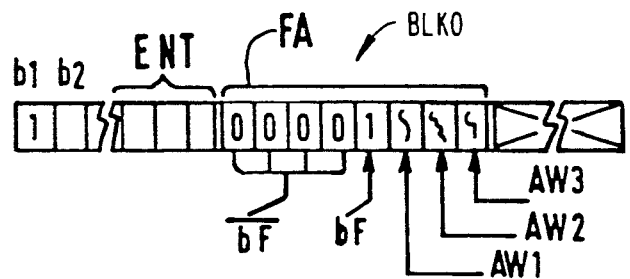
FIG. 3 show the constitution of a header.

The indication of the number of codewords used for transmitting the sequence will now be explained with the aid of FIG. 3. In this Figure codeword BLK0 is represented and also a field FA which is intended to contain the first bits of the various binary words W1, W7, W13 is indicated. According to a characteristic feature of the invention the aforementioned various bits are preceded by a bit bF of a predetermined value, for example, "1". The other bits $\overline{bF}$ of field FA having the opposite value ("0", of course).

Thus, knowing the size of field FA, the detection of the bit $\overline{bF}$ preceded by bits bF makes it possible to determine the occupation rate of this field and, consequently, to provide the number of codewords used for transmitting the sequence. Thus, owing to this characteristic feature, a single additional bit may be necessary for transmitting this indication. Codeword BLK0 also contains information ENT defining a header to denote that this codeword is a declaration codeword for the transmission of the message composed of binary words transmitted in the following codewords.

Figure 4:
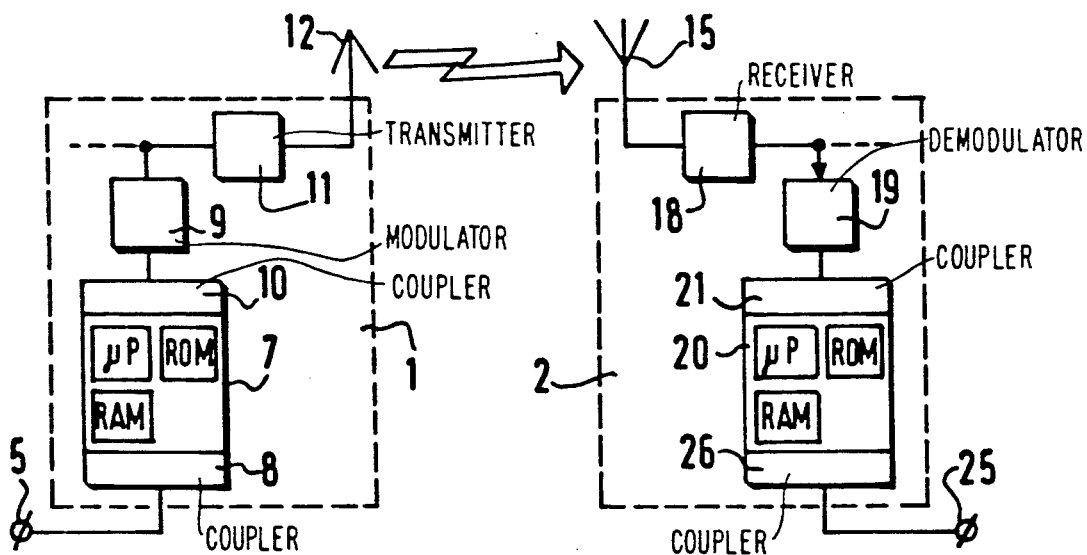
FIG. 4 shows a diagram of a transmission arrangement implementing the method according to the invention.

In FIG. 4 an arrangement implementing the method according to the invention is shown in a diagrammatic manner. In this Figure reference shows the transmitting part of the arrangement and reference 2 the receive part. The send part comprises a terminal 5 for receiving the binary words W(1), W(2), ..., W(F) to be transmitted. These binary words are processed by a send processor circuit 7 which receives them through a coupler 8 that makes a serial-to-parallel conversion possible or through any other circuit suitable for ensuring a proper interface. This coupler is constituted by, for example, a USART. Processed once by circuit 7, the data to be transmitted are applied to a modulator circuit 9 by means of a coupler 10. Thereafter, a transmitting circuit 11 transmits them via aerial 12 by radio link to the receive part 2. The latter receives the transmitted data from part 1 via aerial 15; a receive circuit 18 applies signals to a demodulator 19 which applies them to a receive processor 20 through a coupler 21. The sent binary words WR(1), WR(2), ..., WR(F) are made available at a terminal 25 connected to the output of a coupler 26 coupled to circuit 20. The couplers 10, 21 and 26 may be of the same type as that of coupler 8.

Circuits 7 and 20 may be situated inside a similar apparatus which is used for both sending and receiving. These circuits are conventionally constituted, for example, by microprocessors, dynamic memories and a programme memory. In this particular programme memory the instructions defining the implementation of the invented method are written.

Figure 5:
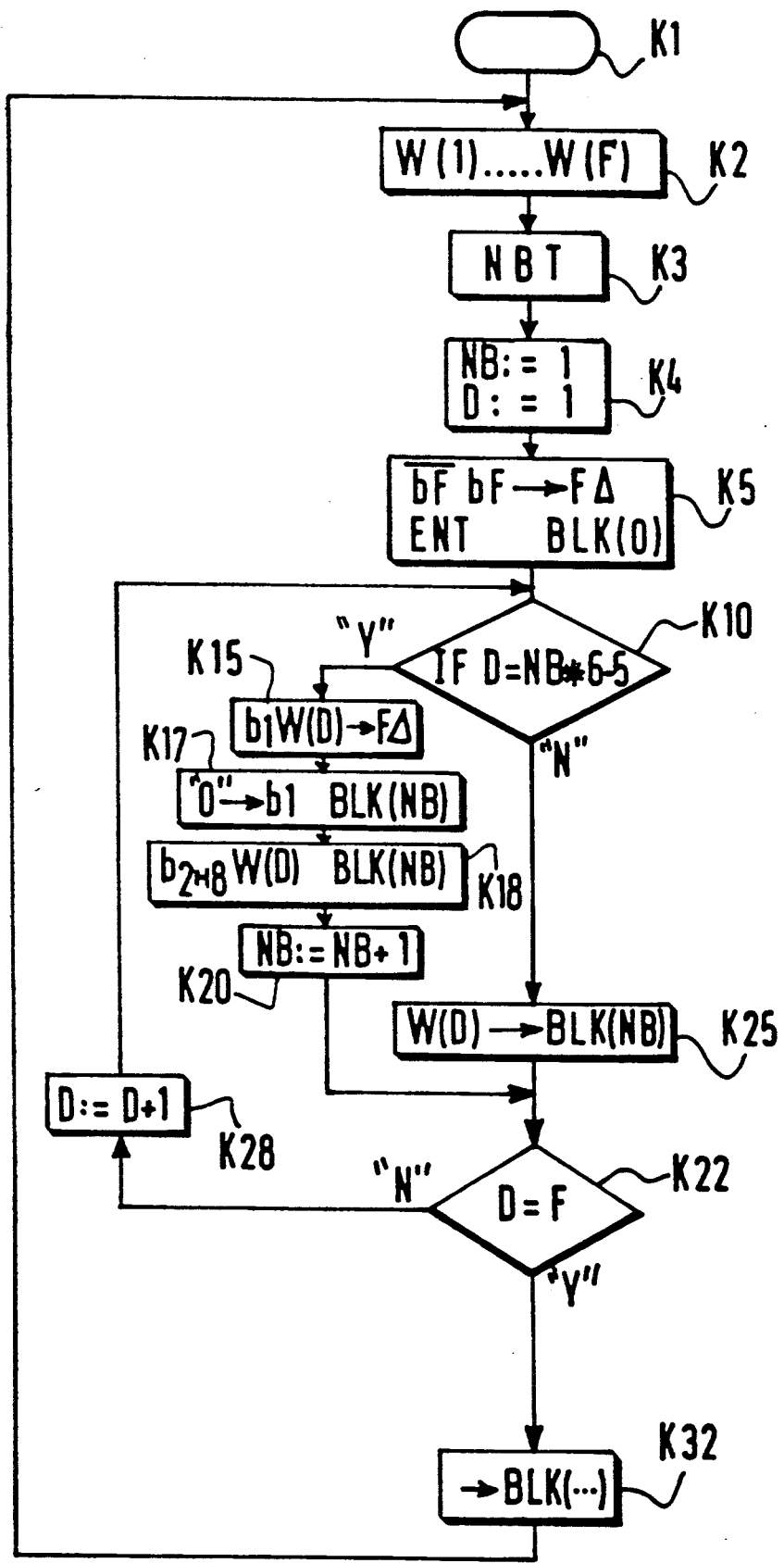
FIG. 5 shows a flow chart defining the method of transmission of the binary words.

FIG. 5 is a flow chart which shows how the data transmission is performed. This flow chart is composed of various boxes. At box K1 the start of the programme is indicated; box K2 denotes that F binary words W(I), ..., W(F) are stored in the memory of circuit 7 and are to be transmitted. Box K3 shows the operations for determining the number of codewords NBT to be used for transmitting these F binary words. At box K4 various variables are introduced which provide NB, the codeword number, and D, the binary word number. Box K5 shows the preparation of codeword BLK(0) which contains the header ENT and the bits $\overline{bF}$ and bF which indicate, as has already been described hereinbefore, the number of codewords used (the number $\overline{bF}$ is directly related to the number NBT).

Box K10 denotes a test of the number of the binary word to be sent. Is it the first number of the codeword? If the answer is affirmative, branch "Y" is taken to arrive at box K15. At this box K15 the operation is indicated according to which the first bit of the binary word W(..) of the beginning of the codeword is positioned as a corrector in the field F $\Delta$ at the location defined by NB. Then, the codeword which will send the binary words is prepared, that is to say, "0" will be positioned at location $b_1$, which is shown at box K17. The remaining 7 bits of the first binary word are arranged in the relevant codeword, i.e. box K18. The number NB is incremented by unity at box K20. From there one proceeds to box K22.

If the answer to the test indicated at box K10 is negative, the whole word is put in the codeword (box K25). Thereafter, box K22 is proceeded to.

At box K22 it is tested whether the binary word is the last word; if not, branch "N" of the test is taken and box K10 is returned to while passing through box K28 where D is incremented. If the test of box K22 proves to be positive, branch "Y" is taken to arrive at box K32 which denotes the transmission process; from this box one may proceed to box K2 and search for another binary word sequence to be sent.

Figure 6:
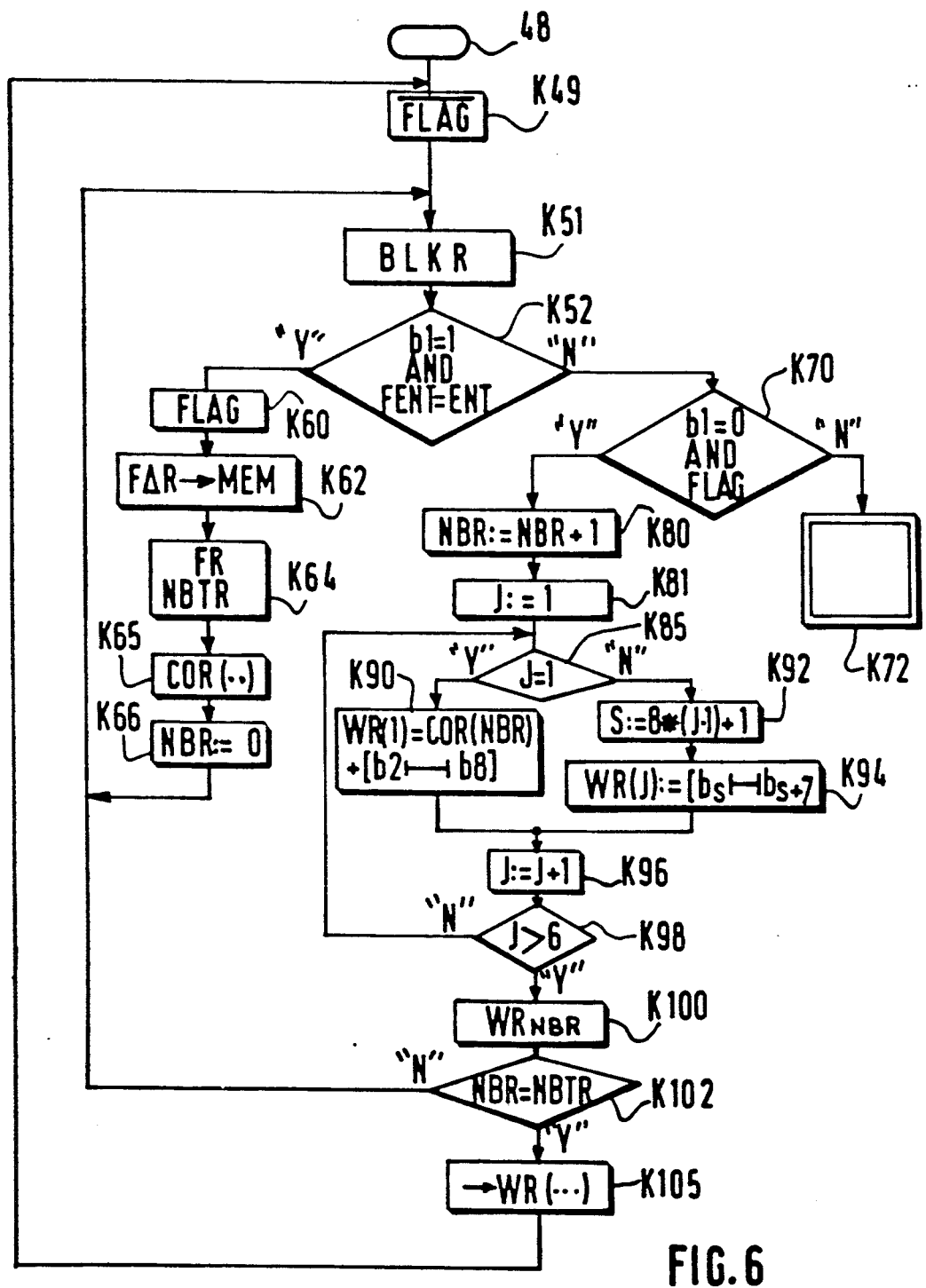
FIG. 6 shows a flow chart defining the method of receiving the binary words.

FIG. 6 shows a flow chart which defines the programme according to which the received codewords BLKR(..) are processed for recovering the received binary words WR(..).

Box K48 denotes the beginning of this programme. At box K49 a flag bit termed FLAG is introduced, which assumes the value $\overline{FLAG}$. Box K51 denotes that a complete codeword is present in the working memory of circuit 20 and that this codeword may be processed in the subsequent stages. First and foremost an analysis is made (box K52) of the first bit $b_1$ of this codeword and one verifies whether a header exists which denotes that the codewords subsequent thereto will transmit binary words W(..). If the test is positive, one takes branch "Y" and positions the FLAG (box K60) to realize the test of box K52. The field F $\Delta$ R is then analyzed and stored in a working memory MEM (box K62); the number of binary words FR which are to be received are subtracted therefrom (box K64) as are the number of codewords NBTR used for the transmission of these words. Box K65 shows that the correction bits COR(..) are prepared to be processed. Thereafter, as denoted by box K66, a counter NBR for the received codewords is initiated.

If the test of box K52 is negative, one takes branch "N" to perform an additional test indicated at box K70. This test has for its object to determine whether the received codeword is linked or not to the header codeword defined in branch "Y" of the test of box K52. Therefore, a test is made to verify whether the bit $b_1 = 0$ and whether the flag bit FLAG has been positioned. If this test has not been verified, branch "N" is taken to arrive at a box K72 which relates to a management processor which does not form part of the invention. If the test of box K70 is verified, branch "Y" is taken and box K80 is proceeded to; at this box the counter NBR is incremented by unity.

At box K81 a counter for words contained in the received codeword BLKR is initiated. If this pointer indicates "1", which is tested at box K85, branch "Y" is taken to proceed to box K90. At this box K90 the first binary word is recovered from the codeword formed by the bit COR(NBR) determined at box K65 and by the 7 bits $b_2$ to $b_8$ of the processed codeword. If the test at box K85 is negative, branch "N" is taken to proceed to box K92 where a pointer for the beginning of word S is updated. This pointer provides the location of the first bit of the binary words contained in the processed codeword. Thus, this makes it possible to recover the binary words WR (box K94). From the boxes K90 and K94, box K96 is proceeded to where the binary word counter J is incremented. The contents of this counter are tested with respect to the number of binary words contained in the codewords (6 in this case). If all the binary words have not been processed, box K85 is proceeded to by taking branch "N"; if not, branch "Y" will be taken to proceed to box K100 where all the processed binary words of the codeword are arranged in a queue memory. Thereafter, at box K102, it is tested whether the codewords have been received properly. If they have, box K105 is proceeded to while taking branch "Y"; if they have not, box K51 is returned to. Box K105 denotes that all the binary words of the sequence are recovered at terminal 25 (FIG. 4) with or without additional processing.

I claim:

1. A method of transmitting binary data words of uniform length p bits, as part of longer codewords, comprising the steps of arranging a sequence of M binary words into a plurality of codewords each having a capacity of (k·p−Δ) bits, where k and Δ are integers; Δ = p; and transmitting said plurality of codewords, characterized in that said arranging step comprises providing a header codeword which includes M<Δ data bits, and information denoting the value M, and transmitting said header codeword as a first of said plurality of codewords.

2. A method as claimed in claim 1, characterized in that said arranging step comprises including in said header codeword a respective first data bit from a respective first data word in each following codeword containing data words in said sequence 3. A method of transmitting binary data words of uniform length p bits, as part of longer codewords, comprising the steps of arranging a sequence of M binary words into a plurality of codewords each having a capacity of (k·p − Δ) bits, where k and Δ are integers and Δ < p, and transmitting said plurality of codewords, characterized in that said arranging step comprises: distributing said M data words among N − 1 codewords, such that, except for N − 1 data words, each data word is contained entirely within one of the respective codewords; and N − 1 data words each have Δ bits respectively omitted from said N − 1 codewords, and providing a header codeword having a field of fixed bit length containing (N − 1)·Δ data bits which form part of the M words and are not contained in other codewords.

4. A method as claimed in claim 3, characterized in that said (N − 1)·Δ data bits are respective first Δ data bits from a respective first data word in each of said N − 1 codewords.

5. A method as claimed in claim 3, characterized in that said arranging step comprises including in said header codeword further information denoting the value M.

6. A method as claimed in claim 3, characterized in that said including step comprises using an occupation rate of said field of fixed bit length to denote the number of codewords used for transmitting the sequence of M words.

7. A transmission system for data words, comprising a send part, a receive part, and means for carrying signals from the send part to the receive part; wherein said send part comprises means for arranging a sequence of M binary words into a plurality of codewords each having a capacity of (k·p − Δ) bits, where k and Δ are integers and Δ < p, characterized in that said part further comprises means for distributing said M data words among N − 1 codewords, such that, except for N − 1 data words, each data word is contained entirely within one of the respective codewords; each having Δ bits transmitted via the header codeword, means for providing a header codeword having a field of fixed bit length containing N·Δ data bits which form part of the M words and are not contained in other codewords, and means for including in said header codeword further information denoting the value M; and said receive part comprises means for recovering from said header codeword said Δ bits of words transmitted in successive codewords.

8. A system as claimed in claim 7, characterized in that said header codeword comprises a respective Δ first data bits from a respective first data word in each said N − 1 codewords.

9. A system as claimed in claim 8, characterized in that said respective Δ first data bits are arranged in a field of fixed length.

10. A system as claimed in claim 9, characterized in that said receive part uses an occupation rate of said field of fixed bit length to determine the number of codewords used for transmitting the sequence of M words.

11. A system as claimed in claim 7, characterized in that said header codeword includes further information denoting the value M.

* * * * *